United States Patent
Cline et al.

(10) Patent No.: US 6,988,211 B2
(45) Date of Patent: Jan. 17, 2006

(54) SYSTEM AND METHOD FOR SELECTING A FREQUENCY AND VOLTAGE COMBINATION FROM A TABLE USING A SELECTION FIELD AND A READ-ONLY LIMIT FIELD

(75) Inventors: Leslie E. Cline, Sunnyvale, CA (US); Xia Dai, San Jose, CA (US); Varghese George, Folsom, CA (US); Robert L. Farrell, Gold River, CA (US)

(73) Assignee: Intel Corporation, Santa Clara, CA (US)

( * ) Notice: Subject to any disclaimer, the term of this patent is extended or adjusted under 35 U.S.C. 154(b) by 515 days.

(21) Appl. No.: 09/751,528

(22) Filed: Dec. 29, 2000

(65) Prior Publication Data

US 2002/0087896 A1    Jul. 4, 2002

(51) Int. Cl.
*G06F 1/26*    (2006.01)
(52) U.S. Cl. .................... 713/300; 713/1; 713/100; 713/322; 711/100
(58) Field of Classification Search ............... 713/601, 713/320, 322, 300, 1, 2, 100; 364/166, 900; 395/750, 750.04; 307/271; 711/217, 100
See application file for complete search history.

(56) References Cited

U.S. PATENT DOCUMENTS

| | | | |
|---|---|---|---|
| 4,893,271 A * | 1/1990 | Davis et al. ................. 713/501 |
| 5,021,679 A | 6/1991 | Fairbanks et al. | |
| 5,153,535 A | 10/1992 | Fairbanks et al. | |
| 5,189,314 A * | 2/1993 | Georgiou et al. ........... 327/114 |
| 5,307,003 A | 4/1994 | Fairbanks et al. | |
| 5,452,401 A * | 9/1995 | Lin ............................. 713/322 |
| 5,490,059 A * | 2/1996 | Mahalingaiah et al. ....... 700/46 |
| 5,544,092 A * | 8/1996 | Gunther et al. ................. 713/1 |
| 5,627,412 A | 5/1997 | Beard | |
| 5,752,011 A | 5/1998 | Thomas et al. | |
| 5,812,860 A * | 9/1998 | Horden et al. .............. 713/322 |
| 5,974,557 A | 10/1999 | Thomas et al. | |
| 6,167,102 A * | 12/2000 | Hellberg ..................... 375/376 |
| 6,216,235 B1 | 4/2001 | Thomas et al. | |
| 6,311,287 B1 * | 10/2001 | Dischler et al. ............ 713/601 |
| 6,425,086 B1 * | 7/2002 | Clark et al. ................. 713/322 |

(Continued)

FOREIGN PATENT DOCUMENTS

JP    09288527 A  *  11/1997

OTHER PUBLICATIONS http://www.active-hardware.com/english/reviews/mainboard/be6.htm, Abit BE6 slot 1 440BX ATA66 motherboard, Jul. 23, 1999.*

(Continued)

*Primary Examiner*—Thomas Lee
*Assistant Examiner*—Mark Connolly
(74) *Attorney, Agent, or Firm*—John F. Travis

(57) ABSTRACT

A selectable control over multiple clock frequency/voltage level combinations that can be activated in a processor. A table can be placed in hardware that defines multiple combinations of CPU clock frequency and CPU operating voltage. By placing the table in hardware, it can be assured that all the various combinations will work for the particular processor device. Software can then be used to select a combination from this table, to control the actual frequency/voltage combination that is being implemented at a given time. This allows dynamic control over the power/performance tradeoff, so that the system can see maximum power savings consistent with acceptable performance, as operating and environmental considerations continue to change the most desirable selections.

23 Claims, 3 Drawing Sheets

U.S. PATENT DOCUMENTS

| | | |
|---|---|---|
| 6,487,668 B2 | 11/2002 | Thomas et al. |
| 2002/0029327 A1 * | 3/2002 | Roth .......................... 711/217 |
| 2002/0073348 A1 * | 6/2002 | Tani .......................... 713/300 |
| 2003/0110423 A1 * | 6/2003 | Helms et al. ............... 714/100 |
| 2003/0201838 A1 * | 10/2003 | Tam et al. .................... 331/74 |

OTHER PUBLICATIONS

Authors, Edwin J. Pole, II, Scott R. Rushford, Eric S. Swartzendruber, and Xia Dai, titled Managing A System's Performance State, U.S. Patent Application, 33 pages. Filed Dec. 3, 1998.

Author, Xia Dai, titled Method and Apparatus to Enhance Processor Power Management, U.S. Patent Application, 26 pages. Filed Sep. 30, 2000.

Author, Tony Hamilton, titled Method and Apparatus for Providing Dynamical Scalability, U.S. Patent Application, 20 pages, Filed Sep. 30, 2000.

* cited by examiner

SYSTEM AND METHOD FOR SELECTING A FREQUENCY AND VOLTAGE COMBINATION FROM A TABLE USING A SELECTION FIELD AND A READ-ONLY LIMIT FIELD

BACKGROUND OF THE INVENTION

1. Field of the Invention

The invention pertains generally to computers. In particular, it pertains to managing performance states in computers.

2. Description of the Related Art

In an effort to conserve energy, computer systems have increasingly begun to implement low-power states, in which various techniques are used to reduce power consumption. This is especially true in battery-powered systems, in which reduced power consumption produces increased operational time between battery charges. These power reduction efforts have been targeted at various levels of the computer systems, ranging from the entire system to individual circuits and devices. Various power states have been defined to provide common terminology in power reduction efforts. States S0 through S5 define system level power states, with S0 being fully operational. S1–S5 define non-operational levels of progressively decreasing power consumption and progressively longer times to recover full operation when returning to the S0 state. States D0 through D3 define similar states for devices, such as disk drives, displays, etc., with D0 indicating fully operational and D1–D3 indicating progressively decreasing power consumption and progressively longer times to recover full operation when returning to the D0 state. States C0 through C3 define similar states for the processor, with C0 indicating fully operational. C1 indicates the CPU is halted with a software instruction, and awaits an interrupt to resume processing. C2 stops the clock to the CPU, but permits other devices to communicate with memory by permitting cache snooping operations to continue. C3 prevents even these operations by shutting down the snooping operation and preventing memory communications with other devices. The common factor in these conventional definitions is that there is only one operational state for the system/device/processor that is being regulated. The remaining states are non-operational, with different combinations of power consumption vs. recovery time.

However, various levels of reduced-power reduced-performance can also be defined for the processor, in which the clock speed, voltage level, or both can be changed. These can be considered sub-states of the conventional C0 state. The semiconductor technology that is typically used in a processor consumes much of its power during the state transition of each transistor. Therefore, reducing the clock speed can decrease power consumption by reducing the number of transitions that take place per second. Of course, this also reduces performance, since fewer operations per second can be performed. Power consumption is approximately proportional to clock speed.

Similarly, reducing the voltage level that powers the processor circuitry will reduce the power consumed by the processor. Power consumption is approximately proportional to the square of the voltage level. However, a reduced voltage level also reduces the maximum frequency at which the processor can operate reliably, so reduced voltage can also require a slower clock speed. Thus, these two power-reduction techniques, reduced clock speed and reduced voltage level, must be coordinated to assure that the tradeoff between performance and power savings produces the desired benefits, while avoiding a combination of voltage and clock speed that renders the processor inoperable or unreliable.

Conventional systems have two methods of coordinating the combination of clock speed and voltage level. One involves hard-wiring the selection into platform hardware. This makes it difficult and expensive to change the available combination when new developments make such changes feasible, and retrofitting such changes into existing systems is virtually impossible. The second method is to program the changes into software. However, this makes it easy to program non-optimal or unfeasible frequency/voltage relationships into the system, thus subjecting the system to software design errors and requiring tighter control over the software vendors.

DETAILED DESCRIPTION OF THE INVENTION

Various embodiments of the invention provide a way to control the permissible combinations of processor clock frequency and processor operating voltage that are available in a processor, while also allowing dynamic selection from among those combinations. By placing each frequency/voltage combination into hardware, the software cannot inadvertently be programmed to produce a combination that is unworkable. At the same time, providing a variety of such combinations in hardware allows software to select the combination that is preferable for the current power/performance environment. The number of such combinations that are available can also be placed in hardware, customized to accommodate the platform and underlying technology, and allowing a single standardized version of the software to adapt itself to various platforms that have different numbers of combinations available.

Figure 1:
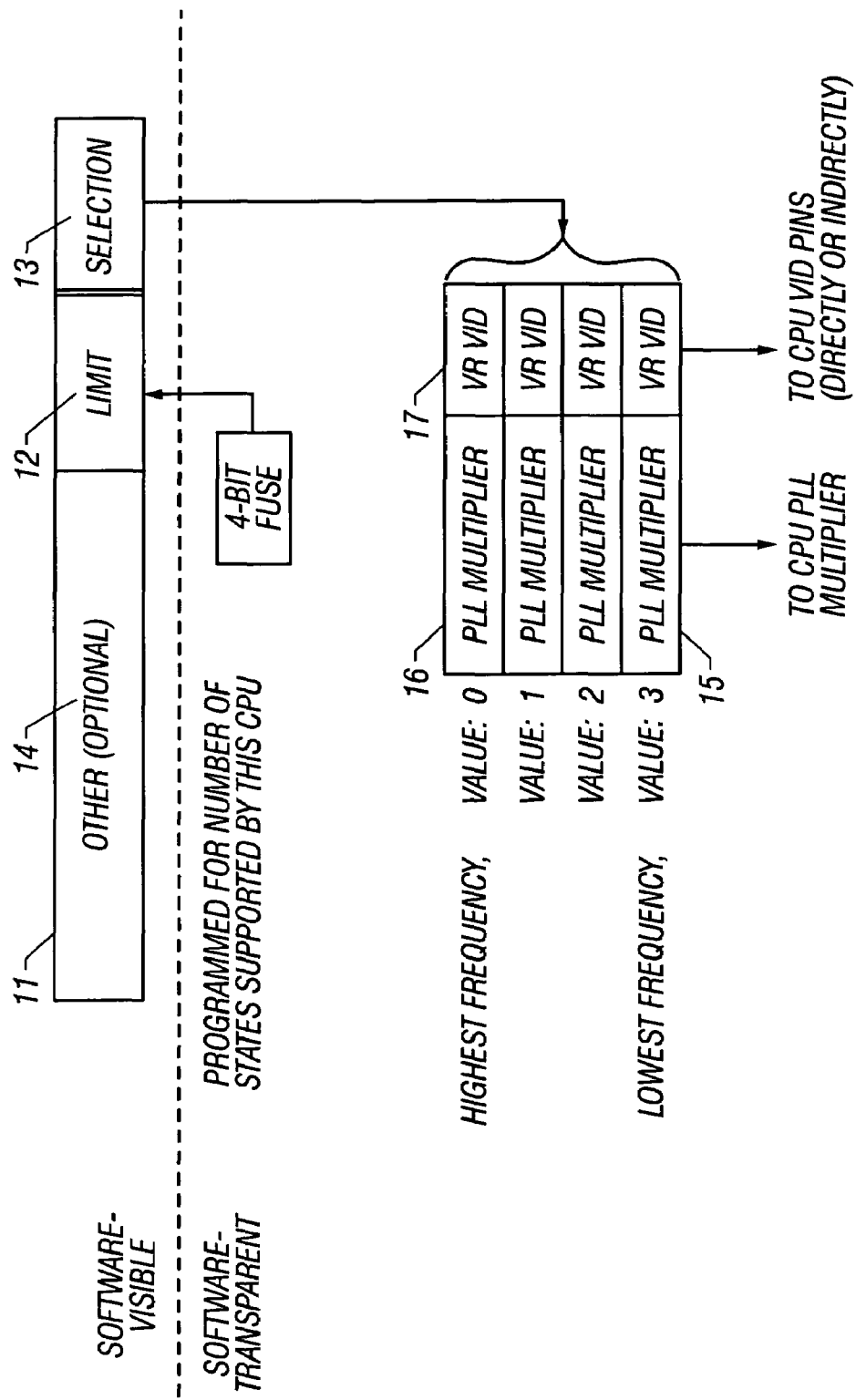
FIG. 1 shows a control register and a frequency/voltage table.

FIG. 1 shows a control register 11 and table 15 for one embodiment. Table 15 can contain a number of entries, with each entry having a frequency field 16 containing a frequency indicator and a voltage field 17 containing a voltage identifier. In one embodiment, table 15 includes at least three entries. Control register 11 can include a selection field 13 to contain a selector that selects one of the entries in table 15. Control register 11 can also include a limit field 12 to contain a number indicating the total number of entries in table 15 that are available for selection. By standardizing the size of the selection field and the limit field, a single version of software can determine these operating limitations for all platforms. Control register 11 can be an existing register, with the aforementioned fields designated for these functions and one or more other fields 14 designated for other functions. Control register 11 can also be a special purpose register, created primarily to contain these fields. Alternately, limit field 12 and selection field 13 can be in separate registers.

Since the number of performance states that are feasible with a given platform can be at least partially dependent on the physical characteristics of the particular platform, limit field 12 can be programmed into the hardware. In one embodiment, limit field 12 can be composed of non-volatile circuits, such as fusible links, that are initially programmed at the factory and are thereafter unchanged. In one embodiment, limit field 12 can be read by the software to determine how many entries of table 15 can be selected, which can also determine how many different frequency/voltage combinations are available for selection. In the example shown in FIG. 1, a four-bit field 12 can contain a binary 0011 to specify that four entries are available in table 15. Using this convention, a value of 0000 would mean that only one entry is available, which effectively indicates that no selection choices can be made.

Since selection field 13 can be used to dynamically select which combination of frequency and voltage are being implemented, selection field 13 can be a read-write field composed of volatile circuits. In one embodiment, selection field 13 can be written by the software to specify the desired power/performance combination. The size of selection field 13 can be pre-defined to accommodate the maximum number of entries in table 15 that are anticipated to be available in all the affected platforms. For example, a four-bit selection field would permit a potential of up to 16 entries, or 16 different combinations of frequency and voltage, from which to select. The content of selection field 13 can be used as a pointer into table 15. In the example shown in FIG. 1, since table 15 has only four entries, a selection field containing a binary 00xx (where x=either 0 or 1) would permit any of the four entries to be selected. As a safeguard to assure that selection field 13 does not permit more entries than are available in table 15, the contents of limit field 12 can be used as a size check before writing into selection field 13.

Table 15 can be programmed into non-volatile storage, such as fusible links, programmable read-only memory (PROM) or flash memory. Placing the contents of table 15 into hardware removes these contents from the control of applications programmers, who may not be familiar with the various frequency/voltage combinations that are suitable for the platform. By making these combinations selectable by the platform vendor, it can be assured that the number of power/performance combinations, as well as their specific values, will be determined by those with the greatest knowledge of which combinations are suitable and desirable for the specific platform.

In table 15, frequency field 16 and voltage field 17 can contain an indicator of the specified quantity rather than directly indicating the quantity. For example, rather than specifying the desired frequency in field 16, a multiplier for a phase locked loop (PLL) can be contained in that field. If a PLL is used to generate the processor clock, the multiplier from frequency field 16 can be sent to the clock generation circuitry, where the PLL output frequency can be multiplied by this quantity to produce the actual processor clock frequency. The use of frequency multipliers in PLL's is known in the art and is not further described herein.

By the same token, rather than directly specifying the desired operating voltage in voltage field 17, the contents of this field can be used to select from among the available operating voltages. In one embodiment, the power supply for the processor has one or more voltage identification (VID) input pins, which select the specified voltage in a manner that has been designed into the power supply. The content of the selected voltage field 17 can be coupled directly to these VID pin(s) to select the operating voltage. In another embodiment, the content of the selected voltage field 17 can be decoded and the output of the decoder used to activate the proper VID pins. Either of these approaches can also be used to select the proper output of a multi-voltage power supply.

The relationship between the frequency and associated voltage for a given entry can be based on many factors. In the semiconductor technology used in many processors, much of the power consumption in a transistor occurs during the transition from one state to another. Simply reducing the frequency of the processor clock can reduce power consumption by reducing the number of transitions per second in the circuitry, even though the operating voltage remains the same. Of course, this also reduces performance by reducing the number of instructions that can be processed per second, so a reduction in processor clock frequency should be considered primarily when the processor does not have much work to do (i.e., is frequently idle), or when the difference in performance is otherwise not obvious to the user. Conversely, when the operating voltage of the processor is reduced, this reduces power consumption even if the clock frequency remains unchanged. So a simple reduction in operating voltage can also reduce power consumption without impacting performance. However, the maximum frequency at which the processor can be reliably operated may be reduced when the operating voltage is reduced. If the processor clock frequency exceeds this maximum value for a given voltage, switching errors can occur, leading to fatal errors in the processor circuitry. Processors are typically operated near the minimum voltage level that is feasible for the processor clock frequency, so a further reduction in that voltage can require an associated reduction in the clock frequency. Thus, a reduction in the processor operating voltage may generally be accompanied by a reduction in processor clock frequency. This is not strictly required, however, since the frequency used at a given voltage may be well within the tolerance for that voltage, making possible a reduction in voltage without a simultaneous reduction in frequency. It is therefore possible for table 15 to have more that one entry in which the same frequency is paired up with different voltages, and/or where the same voltage is paired up with different frequencies. The decision as to which voltages and which frequencies are to be indicated in table 15, and in which combinations, is a decision that can be based on the operating characteristics of the underlying semiconductor technology used in the processor, the performance goals of the applications, the power consumption goals of the system, and various other factors. A detailed treatment of these interrelated factors is beyond the scope of this document. For the purposes of this disclosure, it is sufficient that the size of table 15, and the specific frequency/voltage entries within it, represent different power/performance combinations that can be selected in the manner described above.

As seen in FIG. 1, control register 11 can be visible to the software. For example, the operating system, application program, or other software entity may be able to read the contents of limit field 12 and both read and write the contents of selection field 13. The ability to read or write the remainder 14 of control register 11, if any remainder exists, can depend on what functions are implemented in that remainder. Table 15 can be transparent, or invisible, to the software. In one embodiment, the software has no control over the contents of table 15 and therefore has no need to directly access it. However, the software can be programmed to select particular entries in table 15 to correspond to various environmental and operating conditions in the system. The correspondence between system conditions and the power/performance state, as reflected in the entries of table 15, can be pre-defined so that the software only needs to know which state to select under given conditions. It may not be necessary for the software to know exactly which frequency or voltage is being selected. The selection criteria can be provided to software developers in advance so that the selection algorithms can be determined, but the software itself may not need to know the exact parameters it is selecting.

Figure 2:
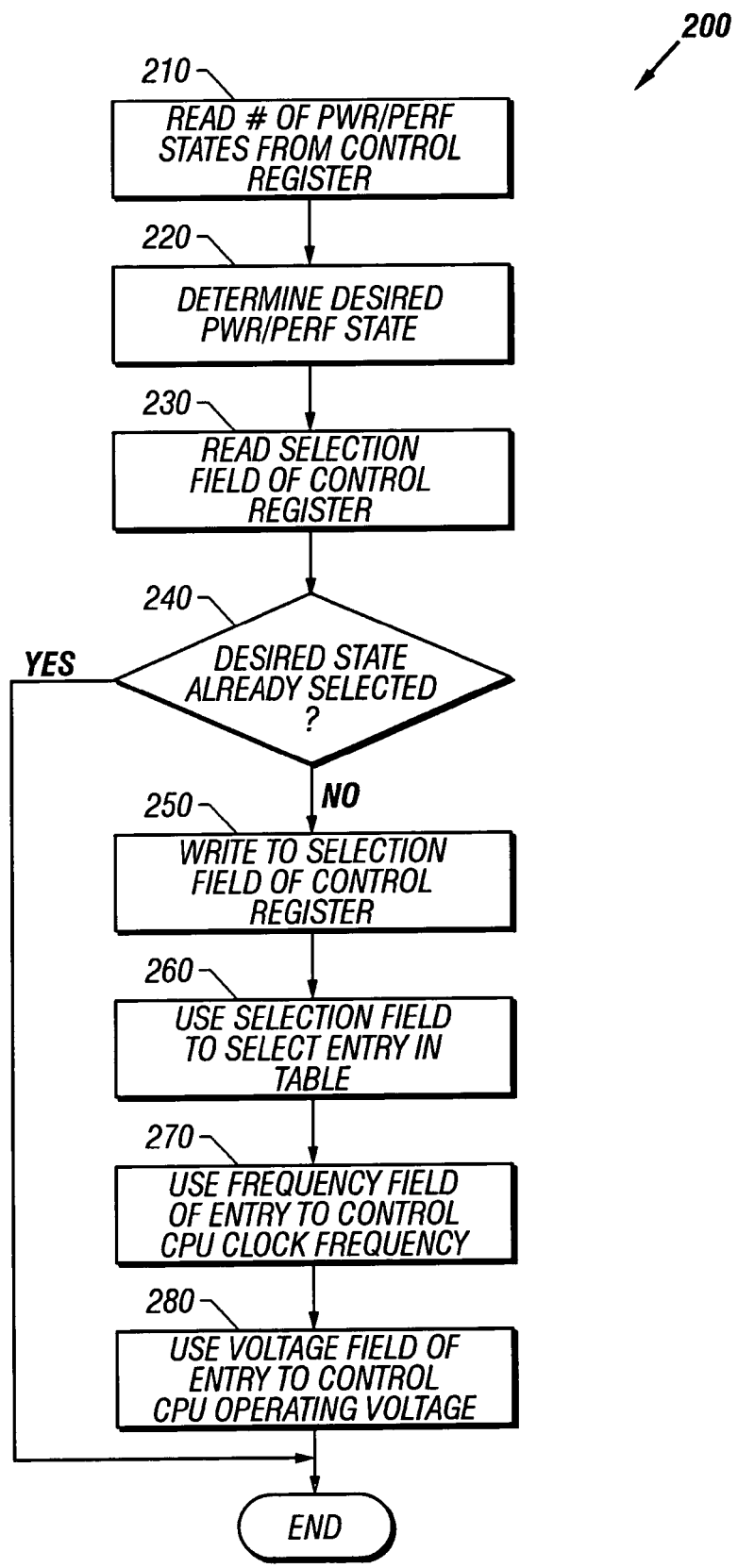
FIG. 2 shows a flow chart of a method.

FIG. 2 shows a flow chart 200 of a method embodiment. The following description of FIG. 2 also references some items of FIG. 1. At step 210, limit field 12 of control register 11 can be read to determine how many power/performance states are available to choose from. Limit field 12 can be a hardware-coded multi-bit field containing a binary number that defines the number of power/performance states that have been designed into the system. Fusible links or other techniques can be used to make this number permanent and non-modifiable once limit field 12 has been programmed. In one embodiment, the contents of this field can be read during initialization and then stored elsewhere for later use. In another embodiment, this field can be read during every pass through flow chart 200 so that storage of the number is not needed.

At step 220, the desired power/performance state is determined from among the available power/performance states. The desired state can be the state that is preferred based on various factors, including environmental, operating, and policy considerations. Various methods of determining which state is preferred are known in the art, and are not discussed herein to avoid obscuring the invention. Once the desired state has been determined, selection field 13 can be read at step 230 to determine if the system is already in the desired state. If step 240 indicates that it is, no further action is necessary, and the sequence can be exited. If it is not, the sequence can continue at step 250. In an alternate embodiment, steps 230 and 240 can be omitted, so that steps 250–280 will be executed even if the system is already in the desired state.

At step 250, the desired power/performance state can be written into selection field 13, where it is used at step 260 to select one of the entries in table 15. In one embodiment, this can be accomplished by using the contents of selection field 13 as an address selector or an offset, so that it directly selects the appropriate entry of table 15. At step 270, the frequency field 16 of the selected entry can be used to control the clock frequency of the CPU, while at step 280 the voltage field 17 of the selected entry can be used to control the operating voltage of the CPU. Both of these steps can be executed simultaneously through hardware decoding of the contents of frequency field 16 and voltage field 17. Alternately, the contents of these two fields can be forwarded to circuitry that changes the clock frequency and voltage level in a deliberate, controlled manner.

Figure 3:
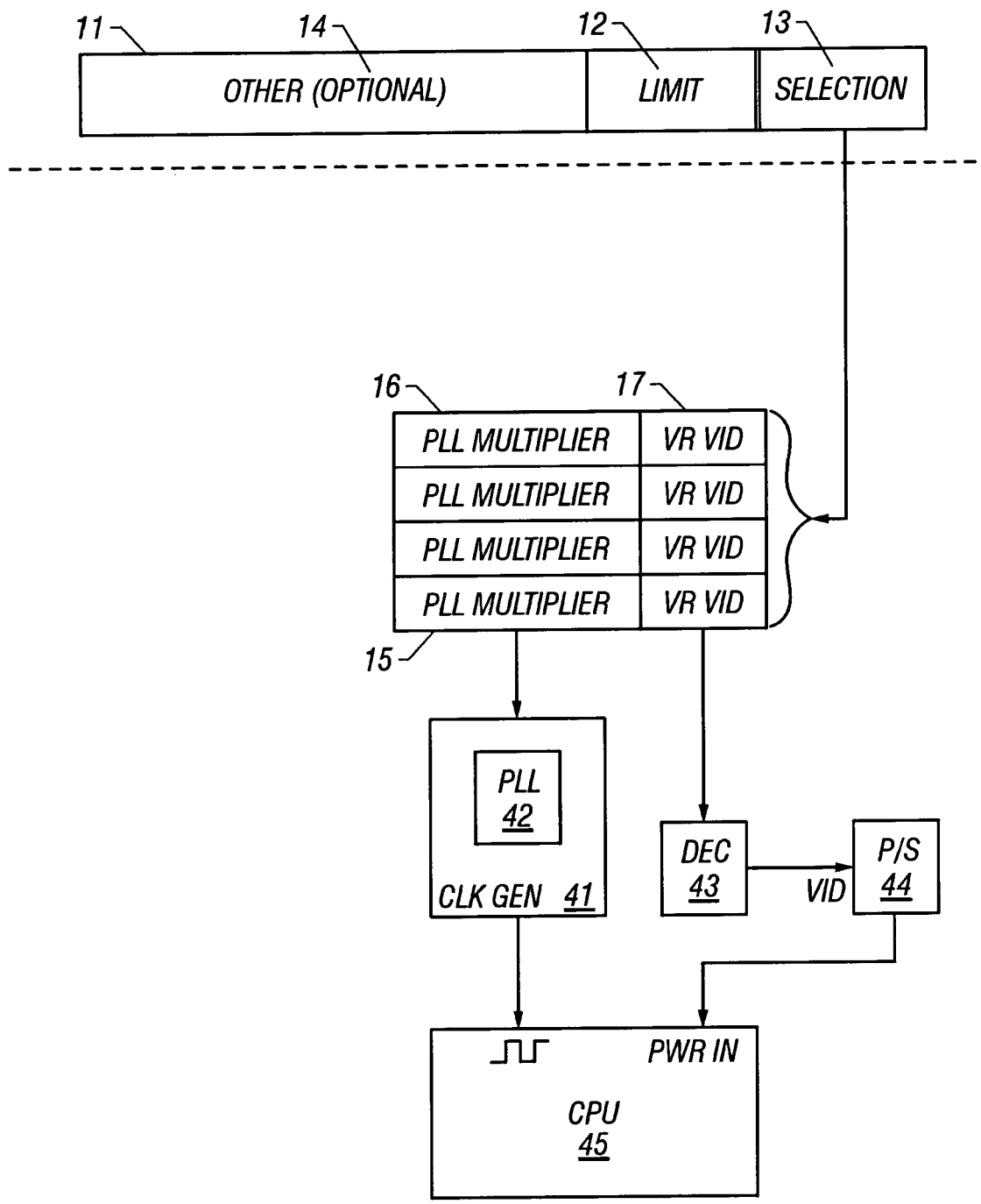
FIG. 3 shows a system including the embodiment of FIG. 1.

FIG. 3 shows a system-level embodiment. Control register 11 and table 15 can be as previously described. The contents of frequency field 16 in the selected entry can represent a multiplier to be used with a PLL to determine the output frequency of the PLL. Signals representing the contents of the frequency field can be sent to clock generator circuit 41, where the multiplier can be fed into the circuit to multiply the frequency of the clock signal output from PLL 42 to the desired value. This output clock, with the desired frequency, can then be sent to the clock input of CPU 45, where it can be used to clock the internal circuitry of the CPU. The contents of voltage field 17 of the selected entry can be sent to the voltage identification (VID) inputs of a multi-voltage power supply 44. The VID inputs can be standard VID inputs on the power supply which are designed to control the operating voltage provided to the CPU. In one embodiment, these inputs are taken directly from the voltage field. In another embodiment, these inputs are processed in a decoder circuit 43 to convert the number contained in the voltage field into a format suitable for the VID inputs of power supply 44.

"Various embodiments can be implemented in circuitry or as a method. Various embodiments can also be implemented as instructions stored on a machine-readable medium, which can be read and executed by at least one processor to perform functions described herein. A machine-readable storage medium and a machine-readable transmission medium include any mechanism for storing or transmitting information in a form readable by a machine (e.g., a computer). For example, a machine-readable storage medium can include read only memory (ROM), random access memory (RAM), magnetic disk storage media, optical storage media and flash memory devices. A machine-readable transmission medium can include electrical, optical, acoustical or other form of propagated signals (e.g., carrier waves, infrared signals, digital signals, etc.), and others."

The foregoing description is intended to be illustrative and not limiting. Variations will occur to those of skill in the art. Those variations are intended to be included in the invention, which is limited only by the spirit and scope of the appended claims.

We claim:

1. An apparatus, comprising:
   a table to contain a plurality of entries, each entry including a frequency field and a voltage field; and
   a register coupled to the table and having a selection field to select one of the plurality of entries, and further having a read-only limit field to specify how many of the entries are selectable;
   wherein each of the selectable entries is to indicate an operationally permissible combination of frequency and voltage.

2. The apparatus of claim 1, wherein the frequency field includes a processor clock frequency indicator.

3. The apparatus of claim 2, wherein the processor clock frequency indicator is a multiplier to be used with a phase locked loop circuit to generate a processor clock frequency.

4. The apparatus of claim 1, wherein the voltage field includes a processor operating voltage identifier.

5. The apparatus of claim 1, wherein the table is disposed in non-volatile memory.

6. The apparatus of claim 5, wherein the table includes at least two entries.

7. A computer system, comprising:
   a clock generator to selectively output a clock signal at any of a plurality of selectable processor clock frequencies;
   a power supply to selectively output any of a plurality of selectable processor operating voltages;
   a table coupled to the clock generator and the power supply and containing a plurality of entries, each entry including a frequency field and a voltage field; and
   a register coupled to the table and having a selection field to select one of the plurality of entries, and further having a read-only limit field to specify how many of the plurality of entries are selectable;
   wherein the selectable entries are each to contain values in the frequency and voltage fields that represent an operationally permissible combination of frequency and voltage.

8. The system of claim 7, wherein the frequency field includes a processor clock frequency indicator.

9. The system of claim 8, wherein the processor clock frequency indicator is a multiplier to be used with a phase locked loop circuit to generate the processor clock frequency.

10. The system of claim 7, wherein the voltage field includes a processor operating voltage identifier.

11. The system of claim 7, wherein the table is disposed in non-volatile memory.

12. The system of claim 11, wherein the table includes at least two entries.

13. A method, comprising:
using a content of a read-only limit field to determine how many of a plurality of entries in a table are available;
writing a selected one of the available entries into a selection field of a register;
using a content of the selection field to select one of plurality of available entries in the table each available entry having a frequency field and a voltage field containing indicators of operationally permissible values for frequency and voltage.

14. The method of claim 13, wherein a content of the frequency field indicates a processor clock frequency.

15. The method of claim 13, wherein a content of the voltage field identifies a processor operating voltage.

16. The method of claim 13, further comprising:
using a content of the frequency field of the selected one of the plurality of entries to control an operating frequency of a processor clock.

17. The method of claim 16, wherein said using the content of the frequency field includes using the content of the frequency field as a multiplier to control an output frequency of a phase locked loop.

18. The method of claim 13, further comprising:
using a content of the voltage field of the selected one of the plurality of entries to control an operating voltage to a processor.

19. The method of claim 18, wherein said using the content of the voltage field includes using the content of the voltage field to select from a plurality of operating voltages to the processor.

20. The method of claim 13, wherein a content of the frequency field and a content of the voltage field in a selected entry of the table are matched to produce a combination of processor clock frequency and processor operating voltage that are operable in an associated processor.

21. A machine-readable storage medium having stored thereon instructions, which when executed by a processor cause said processor to perform:
determining how many of a plurality of voltage/frequency combinations are available for selection by referring to a read-only limit field;
determining a desired combination of processor clock frequency and processor operating voltage from among the available combinations; and
writing to a register to select the desired combination of processor clock frequency and processor operating voltage from a table,
wherein each entry in the table contains values representing a pre-determined combination of frequency and voltage.

22. The medium of claim 21, further comprising:
reading from the register to determine the current combination of processor clock frequency and processor operating voltage.

23. The medium of claim 21, wherein:
determining a desired combination is based on at least one of:
a performance goal;
a power consumption goal; and
operating characteristics of the processor.

* * * * *